US012783982B2

(12) United States Patent
Hatfield et al.

(10) Patent No.: US 12,783,982 B2
(45) Date of Patent: Nov. 3, 2026

(54) USER EXPERIENCE RENDERING FOR INTELLIGENT WORKFLOW

(71) Applicant: INTERNATIONAL BUSINESS MACHINES CORPORATION, Armonk, NY (US)

(72) Inventors: Jennifer M. Hatfield, San Francisco, CA (US); Lucia Larise Stavarache, Columbus, OH (US); Stan Kevin Daley, Espanola, NM (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 17/695,202

(22) Filed: Mar. 15, 2022

(65) Prior Publication Data

US 2023/0297914 A1 Sep. 21, 2023

(51) Int. Cl.
*G06Q 10/0633* (2023.01)
*G06Q 10/0639* (2023.01)

(52) U.S. Cl.
CPC ... *G06Q 10/0633* (2013.01); *G06Q 10/06393* (2013.01); *G06Q 10/06395* (2013.01)

(58) Field of Classification Search
None
See application file for complete search history.

(56) References Cited

U.S. PATENT DOCUMENTS

| | | | |
|---|---|---|---|
| 7,539,297 | B2 | 5/2009 | Whitman, Jr. |
| 8,671,117 | B2 | 3/2014 | Schaffer |
| 8,892,446 | B2 | 11/2014 | Cheyer et al. |
| 10,481,751 | B2 | 11/2019 | Sharon et al. |
| 10,592,261 | B1 | 3/2020 | Sharifi et al. |
| 2004/0138944 | A1 | 7/2004 | Whitacre et al. |

(Continued)

FOREIGN PATENT DOCUMENTS

| | | | |
|---|---|---|---|
| CN | 109166180 | A | 1/2019 |
| JP | 2004-005550 | A | 1/2004 |

(Continued)

OTHER PUBLICATIONS

Sebastian Gorg, et. al., "Real-Time Collaboration and Experience Reuse For Cloud-Based Workflow Management Systems," 2013, IEEE International Conference on Business Informatics, pp. 391-398 (Year: 2013).*

(Continued)

*Primary Examiner* — Amanda Gurski
(74) *Attorney, Agent, or Firm* — CHIP LAW GROUP

(57) ABSTRACT

Artificial intelligence is employed to assess a user's workflow on a task by receiving data regarding a workflow of a user completing a task, and assessing the data to identify attributes of the workflow that is expressed in a series of steps. The steps of the workflow are analyzed to identify areas of improvement. Augmentations may be generated from a plurality of technology fitments matched to the areas for improvement in the steps of the workflow. A user experience template is generated, in which content of the user experience template is selected based upon at least an archetype for which the generating the augmentation from the plurality of technology fitments was performed. The augmentations are formatted in the user experience template and sent to a user device for communicating to the user.

20 Claims, 10 Drawing Sheets

(56) References Cited

U.S. PATENT DOCUMENTS

| | | | | |
|---|---|---|---|---|
| 2009/0216626 | A1 | 8/2009 | Lund | |
| 2013/0159228 | A1 | 6/2013 | Meijer et al. | |
| 2014/0236663 | A1* | 8/2014 | Smith | G06Q 10/0633 705/7.27 |
| 2015/0046233 | A1 | 2/2015 | Srulowitz et al. | |
| 2018/0144244 | A1 | 5/2018 | Masoud et al. | |
| 2018/0144280 | A1 | 5/2018 | Bender et al. | |
| 2018/0152407 | A1 | 5/2018 | Soni | |
| 2018/0232680 | A1 | 8/2018 | Hazime et al. | |
| 2019/0012629 | A1 | 1/2019 | Yan | |
| 2019/0295013 | A1 | 9/2019 | Lhota et al. | |
| 2020/0051449 | A1 | 2/2020 | Chetlur et al. | |
| 2020/0349049 | A1* | 11/2020 | Krebs | G06N 20/00 |
| 2021/0117167 | A1 | 4/2021 | Huang et al. | |
| 2021/0294617 | A1 | 9/2021 | Almecija et al. | |
| 2021/0352134 | A1 | 11/2021 | Bjontegard | |
| 2022/0100769 | A1* | 3/2022 | Shashidhara | G06F 16/24578 |
| 2022/0174052 | A1 | 6/2022 | Blank et al. | |
| 2022/0335340 | A1 | 10/2022 | Moustafa et al. | |
| 2023/0153711 | A1 | 5/2023 | Hatfield et al. | |

FOREIGN PATENT DOCUMENTS

| | | | | |
|---|---|---|---|---|
| JP | 2006-099728 | A | 4/2006 | |
| KR | 1020190081631 | A | 7/2019 | |
| WO | 94/16395 | A1 | 7/1994 | |
| WO | WO-2024127047 | A1 * | 6/2024 | G06Q 30/0267 |

OTHER PUBLICATIONS

Gomes L. M. D. S. Translation alignment and extraction within a lexica-centered iterative workflow (Order No. 10820354), Available from ProQuest Dissertations and Theses Professional, 2017, 193 pages.

United States Non-Final Rejection dated Mar. 18, 2025, 38 pages, in U.S. Appl. No. 17/527,634.

Mell, Peter, et al., “The NIST Definition of Cloud Computing,” Sep. 2011, 7 pages.

Gorg et al. “Real-Time Collaboration and Experience Reuse for Cloud-Based Workflow Management Systems,” 2013 IEEE 15th Conference on Business Informatics, Vienna, Austria, Jul. 2013, pp. 391-398, doi: 10.1109/CBI.2013.63. (Year: 2013).

* cited by examiner

USER EXPERIENCE RENDERING FOR INTELLIGENT WORKFLOW

BACKGROUND

The present disclosure generally relates to managing workflows, and more particularly to analyzing a workflow for optimization.

There is a need to establish methods that capture, frame, and manages the user design experience around intelligent workflows (IW). For example, the recruiting and human resources (HR) spaces are very crowded with platforms, and solutions that focus on job-skill-matching, but the majority of the focus is on hiring. This is done with little understanding of the job without any holistic business perspective of the roles that are the best fit for a candidate. In addition, role deprecation, outsourcing, new directives of strategic leadership can influence the allocation of resources, including changes in skill sets leaving gaps in the existing workflow.

SUMMARY

In accordance with one aspect of the present disclosure, a computer-implemented method is described for using artificial intelligence to assess a user's workflow on a task. In one embodiment, the computer-implemented method includes receiving data regarding a workflow of a user completing a task; and assessing the data to identify attributes of the workflow that is expressed in a series of steps. The method may further include analyzing the steps of the workflow to identify areas of improvement; and generating augmentations from a plurality of technology fitments matched to the areas for improvement in the steps of the workflow. In one embodiment, the method may include generating a user experience template, wherein content of the user experience template is selected based upon at least an archetype for which the generating the augmentation from the plurality of technology fitments was performed. The method can further include sending the augmentations formatted in the user experience template to a user device for communicating to the user.

In another aspect, a system is described for using artificial intelligence to assess a user's workflow on a task. The system can include a hardware processor; and a memory that stores a computer program product. The computer program product when executed by the hardware processor, causes the hardware processor to receive data regarding a workflow of a user completing a task; and assess the data to identify attributes of the workflow that is expressed in a series of steps. The computer program product can also employ the hardware processor to generate augmentations from a plurality of technology fitments matched to the areas for improvement in the steps of the workflow; and generate a user experience template. The content of the user experience template is selected based upon at least an archetype for which the generating the augmentation from the plurality of technology fitments was performed. The computer program product can then send, using the processor, the augmentations formatted in the user experience template to a user device for communicating to the user.

In yet another aspect, a computer program product is described for using artificial intelligence to assess a user's workflow on a task. The computer program product can include a computer readable storage medium having computer readable program code embodied therewith. The program instructions executable by a processor to cause the processor to receive data regarding a workflow of a user completing a task; and assess the data to identify attributes of the workflow that is expressed in a series of step. The computer program product can also analyze, using the processor, the steps of the workflow to identify areas of improvement; and generate, using the processor, augmentations from a plurality of technology fitments matched to the areas for improvement in the steps of the workflow. The computer program product can also generate, using the processor, a user experience template. The content of the user experience template is selected based upon at least an archetype for which the generating the augmentation from the plurality of technology fitments was performed. The computer program product can also send, using the processor, the augmentations formatted in the user experience template to a user device for communicating to the user.

BRIEF DESCRIPTION OF THE DRAWINGS

The following description will provide details of preferred embodiments with reference to the following figures wherein.

DETAILED DESCRIPTION

Figure 1:
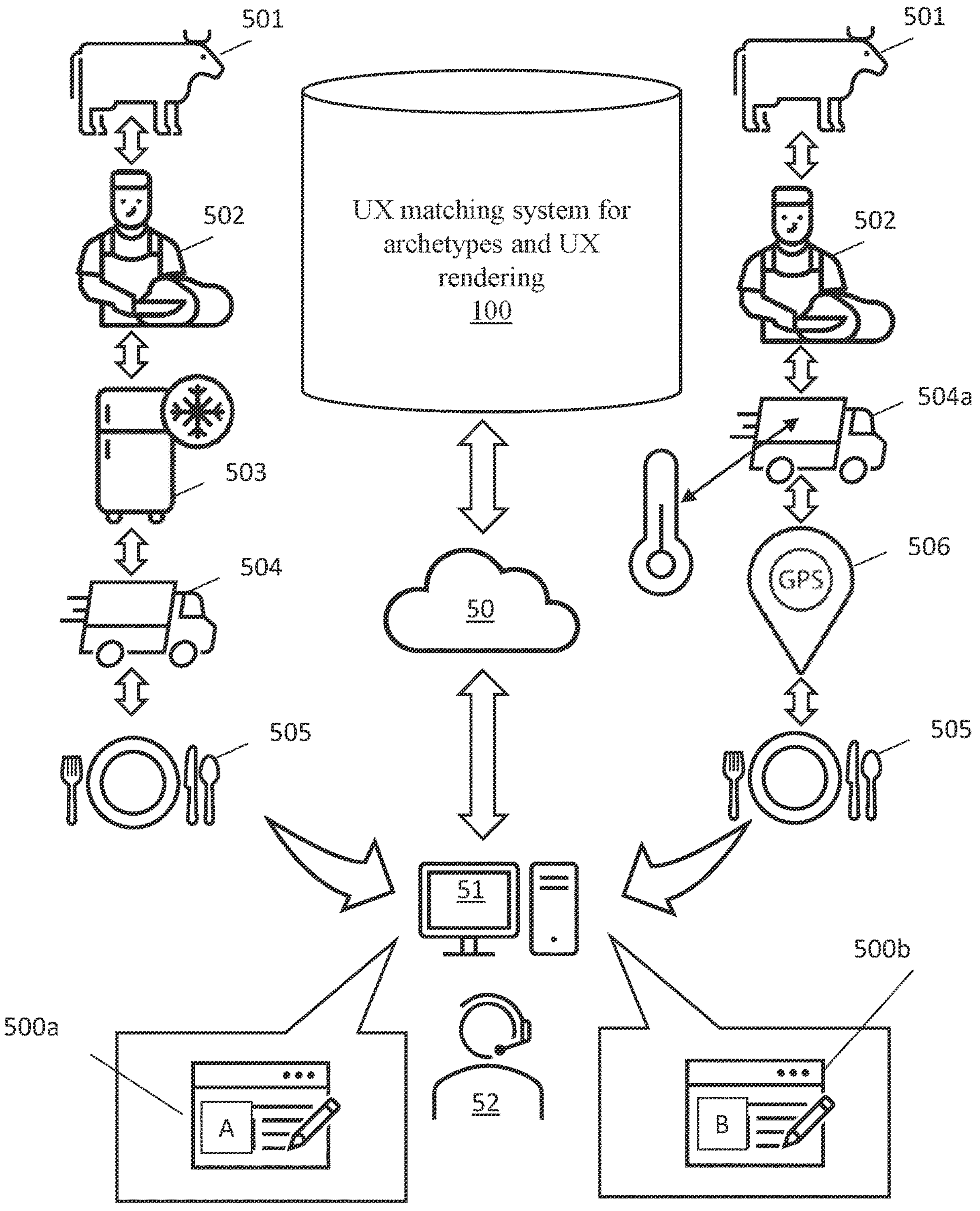
FIG. 1 is an illustration of an application for the user experience matching system for archetypes and user experience renderings that can be integrated into the system for providing an intelligent workflow, in accordance with one embodiment of the present disclosure.

The methods, systems, and computer program products described herein relate to frameworks for providing an intelligent workflow (IW) user experience (UX) that includes a human centered element for providing an optimal and viable process. An intelligent workflow can be the orchestration of automation, AI, analytics, and skills to fundamentally change how work gets done. An intelligent workflow can minimize friction through automation.

Through the intelligent workflow framework, the methods, systems and computer program products of the present disclosure can facilitate a human centered design engagement model that can increase attentiveness and responsiveness that is directly correlated and linked to an increase in optimization, productivity and efficiency. The methods, systems and computer program products of the present disclosure can start with user behavior inputs, core technology and industry to shape the context of where we can apply an intelligent workflow adjustment, and how an intelligent workflow adjustment can apply to an existing process. Intelligent workflow adjustments are configured from a series of users to form “experience patterns”, and their associated activities. The experience patterns can drive the formation of an intelligent workflow to determine the best suited user experience for the user (employee and/or customer).

There is an emergent need to establish methods that capture, frame and manage the user design experience (UX) around intelligent workflows. This methods, systems and computer program products described herein establish a system and method that can lock down the frame and associated method to the workflow as a base invention. The three stages of insight and visibility include 1) the existing work process, 2) identifying intelligent workflows and assigning technologies, and 3) appropriating best design system and workflow optimization purposes. As a result of all this, increased transparency into the various workflows and constant monitoring of machine leaning of the new methods for user and workflow optimization purposes is provided.

The methods, systems and computer program products described herein establish a framework for assessing an existing process. For example, based on technology fitment, the system defines a user experience that establishes a method for how an intelligent workflow engages with a user prompting interaction to continue to obtain higher levels of optimization.

In some embodiments, intelligent workflows are about the recognition of patterns dependencies and conditions that make up those patterns. Triggers are identified to alert the user to a new flow or the possibility of a new flow being formed.

A method of sequencing can be transparently visualized by the system for increased understanding and accountability of automation. Situation analysis of the user experience and recommendations that transparently demonstrate how the intelligent workflow augments and redistributes existing processes with new streamlined experience are provided. In some embodiments, through the user interacting with the system, patterns are identified to inform a recommendation technology fitment, such as blockchain, hybrid cloud, Internet of things (IoT), artificial intelligence (AI), and edge and 5G computing to communicate the experience of the workflows, before, during and after they occur. The user experience template output is flexible and adaptable according to the persona, area of focus and sector, plus other defining variables. The modality of the experience presentation layer is determined by the observation of context, environment, data display an interaction level requirements, e.g., mobile display or voice user interface (UI). The modality can be the interface. It can be classified as a desktop computer or a device as part of a mobile application.

In some embodiments, the methods, systems and computer program products of the present disclosure provide a dynamically generated interface driven by an intelligent workflow augmentation, identified archetype roles, and the archetypes primary factors of situation and context, data inputs and data outputs. In some embodiments, the methods, systems and computer program products can provide continuous monitoring and automatic adjustments to the user experience (UX) based on usability findings, adoption by the user, and workflow system change inputs.

In these embodiments, by making automatic adjustments to the user experience (UX) based on the aforementioned factors, methods, systems and computer program products can optimize the overall intelligent workflow. In some examples, by providing the above, the methods, systems and computer program products can provide a seamless integration of a human user into an intelligent workflow via dynamic UX creation and delivery.

In some embodiments, the methods, systems and computer program products can assess the existing experience to identify and rank intelligent workflows or the digitization scenario and journey The existing experience being assessed can include situational content analysis and/or the breakdown of applicable scenarios. Situational awareness can include elements of when a user is performing within an intellectual workflow, and where the user is performing within an intellectual workflow, e.g., remote work, in field work, and mobile work. This intelligent system will be able to identify matching intelligent work flows (WFs) and for each IW augment the steps with additional activities collected from the environment, personas, industry and business cases.

The systems and methods described herein can assess the user experience based on user archetypes (personas) and workflow framework. The archetypes are a description of a person from the perspective of a workflow, and the types of roles the person would perform. The framework could include technologies, such as artificial intelligence (AI), extended reality (XR) and edge computing. This can create a standardization of how the UX can be implemented based on an overarching framework. In some embodiments, this case include digital overlays to assist in work and could be applied to enable automation of activities.

In some embodiments, the methods, systems and computer program products that are described herein can predict/forecast and recommend UX changes in an intelligent workflow based on a plurality of changes to individual activities and sensor readings. In some embodiments, the system and method that take input from different tools and applications and draws a user experience intelligent workflow that is backed by a toolchain, known to the user. In some embodiments, the system and method can authenticate and monitor preferred behavioral actions from various channels, such as multifactor audio/video sensor’s ability to meet primary IoT feeds. In some embodiments, the systems and methods can customize the environment based on type of activity with predetermined tools associated with that activity.

In some embodiments, the methods, systems and computer program products that are described herein can predict/forecast and recommend UX changes in an intelligent workflow based on a plurality of changes to individual activities and sensor readings. In some embodiments, the system and method that take input from different tools and applications and draws a user experience intelligent workflow that is backed by a toolchain, known to the user. In some embodiments, the system and method can authenticate and monitor preferred behavioral actions from various channels, such as multifactor audio/video sensor’s ability to meet primary internet of things (IoT) feeds. In some embodiments, the system and method customize the environment based on type of activity with predetermined tools associated with that activity. In some embodiments, the system and method can refresh the environment to optimize the participants engagement and productivity level.

The methods, systems and computer program products are now described in greater detail with reference to FIGS. 1-10.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates an application for the user experience (UX) matching system 100 for archetypes and user experience renderings that can be integrated into the system 200 for providing an intelligent workflow. In one application, the methods, systems and computer program products can provide to the user, a user experience (UX) template that illustrates changes in a supply chain in response to following an intelligent workflow (IW) that may be integrated to enhance the supply chain. In the example depicted in FIG. 1, the system 100 may be applicable to a change in a supply chain that employs frozen food products, e.g., frozen beef, to a supply chain that employs only fresh food products, e.g., fresh beef (that has not been frozen). The archetype in this case could be those working in the food industry, e.g., a manager of a restaurant or even a chef. The disruption this change is causing in their supply chain, from the field to the grill, can be significant. The original workflow may include sourcing livestock 501, butchering the livestock 502, freezing product for storage 503, shipping 504 and then food preparation 505 do not have to consider the spoilage issues of a never frozen product. The user experience template for the frozen food supply chain is depicted by reference number 500*a*.

Turning to the never frozen supply chain, the process flow may also include sourcing livestock 501 and butchering the livestock 502, but does not include freezing product for storage 503 prior to shipping 504*a*. In the fresh food process flow depicted in FIG. 1, for every package of fresh food product, e.g., box of beef, constant real-time data can be provided on its temperature range. The shipping 504*a* vehicles may include sensors for monitoring temperature. Additionally, the process flow include global positioning system (GPS) 506 tracking for vehicles. In this manner the temperature from the point following butchering to the point at which the food is to be prepared can be tracked. If the analytics see that a box or an entire shipment in, say, a truck has stores that have temperatures that are outside their freshness window, the method can send an alert to the user of the intelligent workflow. This intelligent workflow can employ artificial intelligence (AI), IoT, automation, and analytics to drive very specific insights that cause real-time actions to maintain the products within their monitoring temperature window. The intelligent workflow also includes the step of food preparation In connection with providing an intelligent work flow for the fresh food supply chain, the methods, systems and computer program products including a user experience matching system 100 that can provide a user experience template 500*b* corresponding to the changes provided by the intelligent workflow. The changes may be illustrated in the user experience template by the data box "B". The data box B may be an alert for when food products are outside the temperatures for suitable consumption during transport.

It is noted that the application depicted in FIG. 1 is only one embodiment of the present disclosure. Other examples and embodiments are within the scope of the present disclosure. It is not intended that the methods, systems and computer program products of the present disclosure be limited to only the example that is described in FIG. 1.

Figure 2:
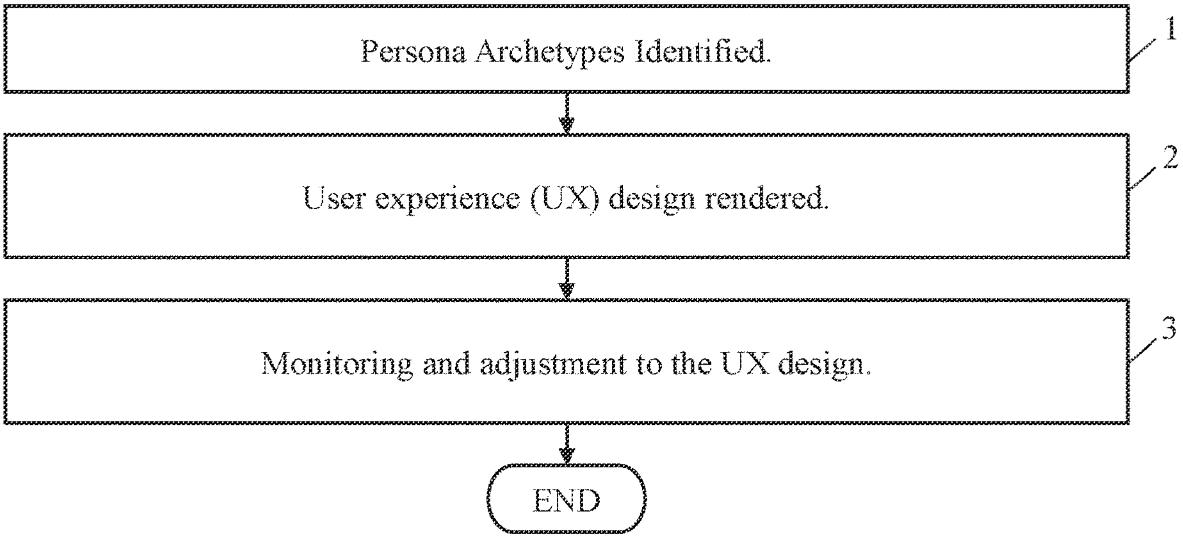
FIG. 2 is a flow/block diagram illustrating the high level steps of a method for rendering a user experience template in an intelligent workflow, in accordance with some embodiments of the present disclosure.

In some embodiments, the methods, systems and computer program products that are described herein provide for an intelligent workflow with a process flow that can begin with user needs being defined from research inputs. FIG. 2 illustrates one embodiment of a summation of a computer implemented method for an intelligent workflow experience framework generator. From a specific workflow, key Persona Archetype(s) are identified based on research outputs as described in block 1 of FIG. 2. An archetype is a definition of a person by their role in a work flow. For example, the archetype needs are defined based on the following: 1) environmental factors; 2) data inputs; and 3) data outputs.

Environmental factors include where the user performs specific activities currently and where that may shift based on workflow automation. For example, if the IW is being performed by personnel in an office setting or at a mobile location, this information can be important to generating a user experience (UX) rendering. Data inputs include what type of data or information the user would need to engage with depending on the workflow. Data outputs include what type of data or interaction the user would need to engage in. This may include attaching or sharing information about their environment.

Block 2 of the process flow illustrated in FIG. 1 includes the user experience (UX) design being rendered and tested. In some embodiments, rendering the UX design may begin with rending an experience template. The experience template is rendered to support the technology and archetype needs. In some embodiments, the experience template is rendered to support the technology and archetype needs based on the type of technology, attributes, user engagement model, and persona archetypes. Further details for the step of continuous monitoring are provided in step 5 of FIG. 5.

It is noted that at block 3 continuous observations and adjustments are made to the archetypes based on the entire workflow. Through the intelligent workflow (IW) framework, the methods, systems and computer program products can facilitate a human-centered design engagement model that can increase attentiveness and responsiveness of the users. Intelligent workflows can be about the recognition of patterns, e.g., the dependencies and conditions that make up those patterns. The intelligent workflow framework can be directly correlated, and linked to an increase in optimization, productivity, and efficiency.

In some embodiments, the system assembles an interface with inputs and outputs. Branding elements are applied from a data source. Branding elements may be products having a brand name, e.g., third party products.

In some embodiments, the user experience (UX) is multimodal and can manifest depending on the environment and user driven needs. The UX is delivered to the user via identified modality based on archetype, e.g., desktop, watch, mobile device (tablet, laptop, smartphone, and voice (user interface). The UX is tested ongoing with user. Adjustments are made to the UX design and delivery based on data changes, specific user preferences, and the level of actual engagement.

In some embodiments, the UX is tested throughout the process flow, e.g., being ongoing, for the users. Adjustments can be made to the UX design and delivery based on data changes, specific user preferences, and level of actual engagement.

Referring to block 3 of the method depicted in FIG. 1, continuous monitoring and adjustments can be made. In one example, the system continuously monitors the user activity and engagement with the user experience (IX). UX efficiency adoption is monitored. In some embodiments, usability factors are identified and addressed. For example, if a user is receiving a call to action on their desktop, but is in the in the field using a tablet, this could be corrected via user input, system observation and sniffer identifying type of device connected with user at that moment. In some embodiments, an automated UX experience templated modularization enables the user interface to dynamically update and refresh to meet the needs to the workflow and the user through validation of the archetype attributes.

Figure 3:
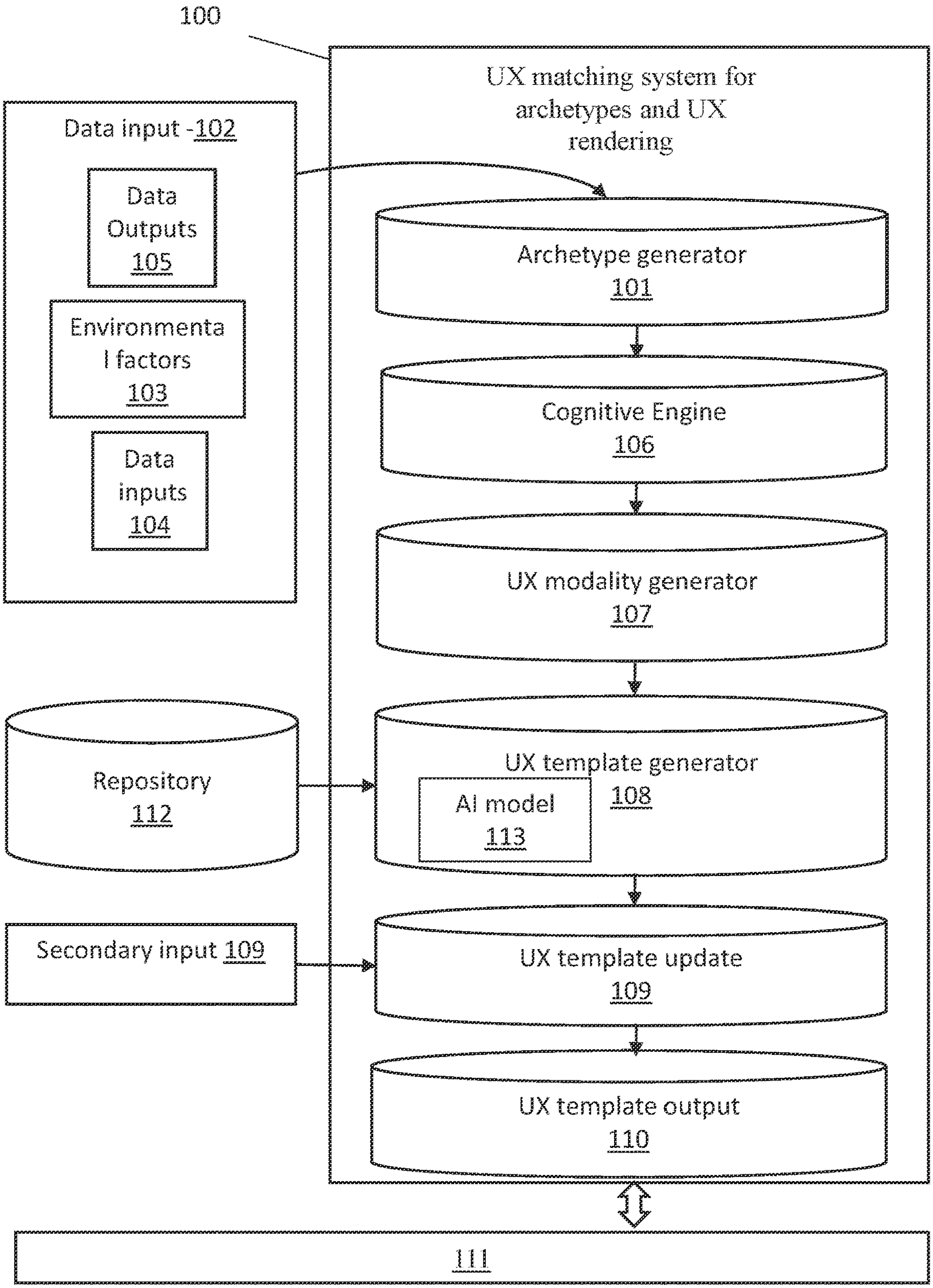
FIG. 3 is a block diagram depicting one embodiment of a system for rendering a user experience (UX) as part of providing an intelligent workflow, in accordance with some embodiments of the present disclosure.

FIG. 3 illustrates one embodiment of an intelligent workflow UX matching system 100 for archetypes and user experience (UX) rendering. For the intelligent workflow UX matching system 100, some predetermined factors can include research inputs, sector focus, task/activity focus, technology fitment and archetypes. The intelligent workflow UX matching system for archetypes 100 and UX rendering 100 may perform the steps consistent with blocks 1, 2 and 3 of FIG. 2.

In some examples, the archetypes are pre-determined based on task. Tasks can also be pre-determined. For example, a task may be book-keeping, while an archetype may be an accountant. The intelligent workflow user experience (UX) matching system for archetypes and user experience rendering 100 can provide a user experience (UX) method based on primary factors, such as situation and context, data inputs, and data outputs; and is based on secondary factors, such as archetype/persona preferences (explicitly determined or most favored learned over time). Another example of a secondary factor is UX efficiency adaption (efficiency is monitored and adjusted if determined as less effective).

In some embodiments, the intelligent workflow UX matching system for archetypes and user experience rendering 100 includes an archetype generator 101. The archetype generator 101 determines the archetype. The archetype generator 101 is in communication with a data input interface 102. In some embodiments, the data input interface 102 includes environmental factors reviewed 103, data inputs 104 and data outputs 105. The environmental factors reviewed 103 can include environmental conditions, such as weather variants, lighting conditions (e.g., dark or light), and ambient noise (e.g, loud or quite noise environments). Other environmental factors that can be reviewed can include the location where a user is working. For example, the location could be a factory, a field (e.g., field work application), a desk job, as well as a mobile application.

The data inputs 104 can include data elements, such as a data display, type of visuals required, content required, interactivity required, conditions/dependencies and combinations thereof. The data inputs 104 can be directed to what the user will see or the user will do for the user experience (UX). It is data directed to the functions being performed by the user, and hence used to define an archetype.

The data outputs 105 can include data elements, such as action/response required, type of interaction, timing (e.g., how often something occurs), variables, conditions and combinations therefore. Data outputs 105 are typically concerned with what output or action is needed from the user in the user experience.

Referring to FIG. 3, in some embodiments, the environmental factors 103, data inputs 104 and data outputs 105, as well as the archetype provided from the archetype generator 101, are fed into the cognitive engine 106. The cognitive engine 106 can determine attributes matching overall inputs with user experience (UX) with UX modality types. In some embodiments, the cognitive engine 106 determines environmental factors to define the user experience (IC) modality. The modality is the type of interface that the user is employing. The modality can be a mobile computing device, e.g., when the person is in the field or it may be a desktop.

Still referring to FIG. 3, in some embodiments, the cognitive engine 106 feeds into a user experience modality generator (i.e., UX modality generator 107). The user experience modality generator 107 identifies the UX modality, which is determined by the environmental factors from the cognitive engine 106. By UX modality it is meant the type of device on which the user is using. For example, when the user is in the field, e.g., a manufacturing plant, at the client, or present at an agricultural site, the modality may be a mobile device. In this example, the field is the environmental factor that is being considered when determining the appropriate modality. For example, the modality may be a tablet computer, a laptop computer, a smartphone, or other type of mobile computing device. In another example, when the user is in an office setting, the modality may be a fixed device. For example, the modality may be a desktop computer, or another type of input station that is fixed, e.g., a specific terminal to a specific type of device. In this example, the environment is the office. In yet another example, the environment may be a mobile environment, such as a vehicle. In this case the modality may be the interface of a vehicle.

In some embodiments, following the user experience (UX) modality generator 107 generating the modality, a UX template generator 108 can generate UX templates. The UX template generator 108 can render UX templates based on the modality determined by the user experience (UX) modality generator 107. The type of templates that can be output by the UX template generator can include user interface (UI), voice user interface, haptic feedback type interfaces, and augmented reality (AR) and/or virtual reality (VR) user interfaces.

The UX template generator 108 takes into account the modality and provides a template that is formatted to meet the display requirements for the modality that the user is employing. For example, a mobile device screen can have a different orientation than a desktop computer, and can have a different orientation than an interface of a motor vehicle. In addition to orientation, size, i.e., the physical dimensions, of the interfaces are also considered. The UX template generator 108 has access to a template repository 112. The template repository 112 includes templates, e.g., wireframes, for user experiences used in prior intelligent workflows. In some embodiments, the templates may be wireframes that have been tagged for data fields and input fields that correspond to elements of the intelligent workflows, such as archetypes for users in the workflow and modalities of the users. Other elements can be the tasks performed by the archetypes, as well as the environment in which the workflow is being performed.

The UX template generator 108 also includes an artificial intelligence (AI) model 113 to match the archetypes and modalities from new intelligent workflows (IW) to the fields in the wireframes of the repository 112. The artificial intelligence (AI) model 113 may include a neural network that is trained to match the archetypes and modalities from the new intelligent workflow inputs to the tagged elements in the repository 112.

Figure 4:
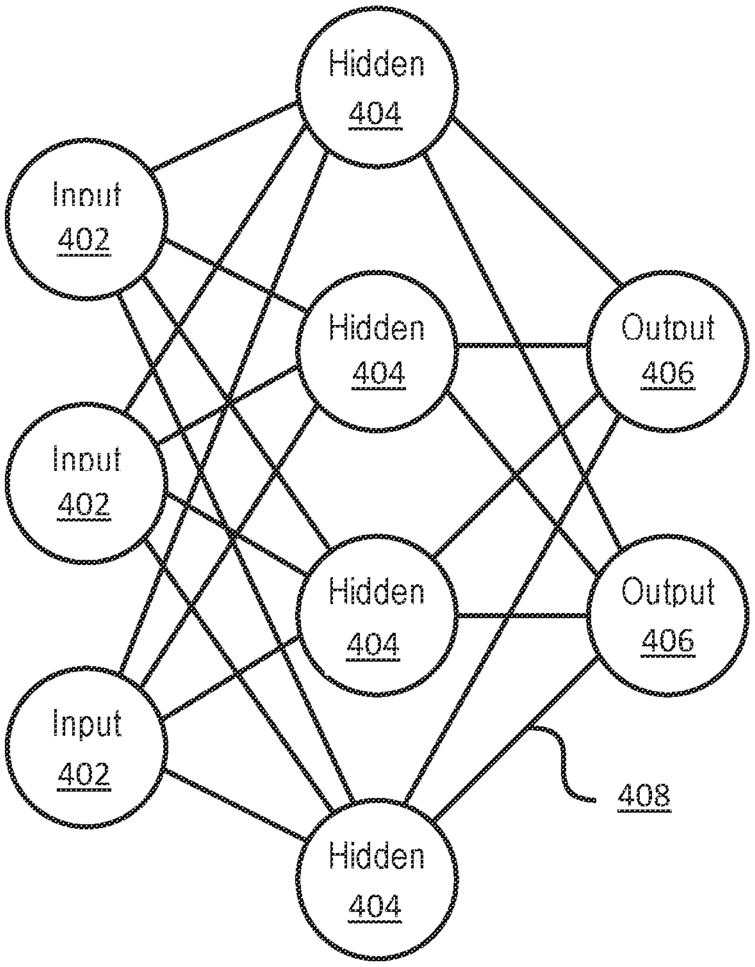
FIG. 4 is an illustration of an example environment illustrating a neural network for an artificial intelligence model.

FIG. 4 is an illustration of an example environment illustrating a neural network for an artificial intelligence model 113.

One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 402 that provide information to one or more "hidden" neurons 404. Connections 408 between the input neurons 402 and hidden neurons f04 are weighted, and these weighted inputs are then processed by the hidden neurons f04 according to some function in the hidden neurons f04. There can be any number of layers of hidden neurons f04, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 406 accepts and processes weighted input from the last set of hidden neurons 404.

This represents a "feed-forward" computation, where information propagates from input neurons 402 to the output neurons 406. Upon completion of a feed-forward computation, the output is compared to a desired output available from training data. The error relative to the training data is then processed in "backpropagation" computation, where the hidden neurons 404 and input neurons 402 receive information regarding the error propagating backward from the output neurons 406. Once the backward error propagation has been completed, weight updates are performed, with the weighted connections 408 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted. In some embodiments, the AI model 113 trains to match archetypes and modalities of intelligent workflows to tagged data fields for UX renderings that is stored in repositories 112.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 408 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 408 may be implemented as resistive processing units (RPUs), generating a predictable current output when an input voltage is applied in accordance with a settable resistance.

In one example, the trained artificial intelligence model can provide for matching archetypes and modalities of intelligent workflows to wireframes suitable to provide user experience (UX) renderings.

Still referring to FIG. 3, the intelligent workflow UX matching system 100 may also include an update module 109 for continuously updating the templates in response to new data and a level of acceptance of the UX templates by the users. More specifically, in response to historical acceptance and rejection of UX templates, the update module 109 can measure, refine and personalize the UX method as it is used or a preference set is established. As noted, the update for the UX method is continuous.

Referring to FIG. 3, in some embodiments following selection of the UX template, a workflow and user adoption step may follow. This can be provided by the UX template outlet 110. The UX template outlet 110 provides data to a user interface. At the user interface, the user can accept the updated template.

Figure 5:
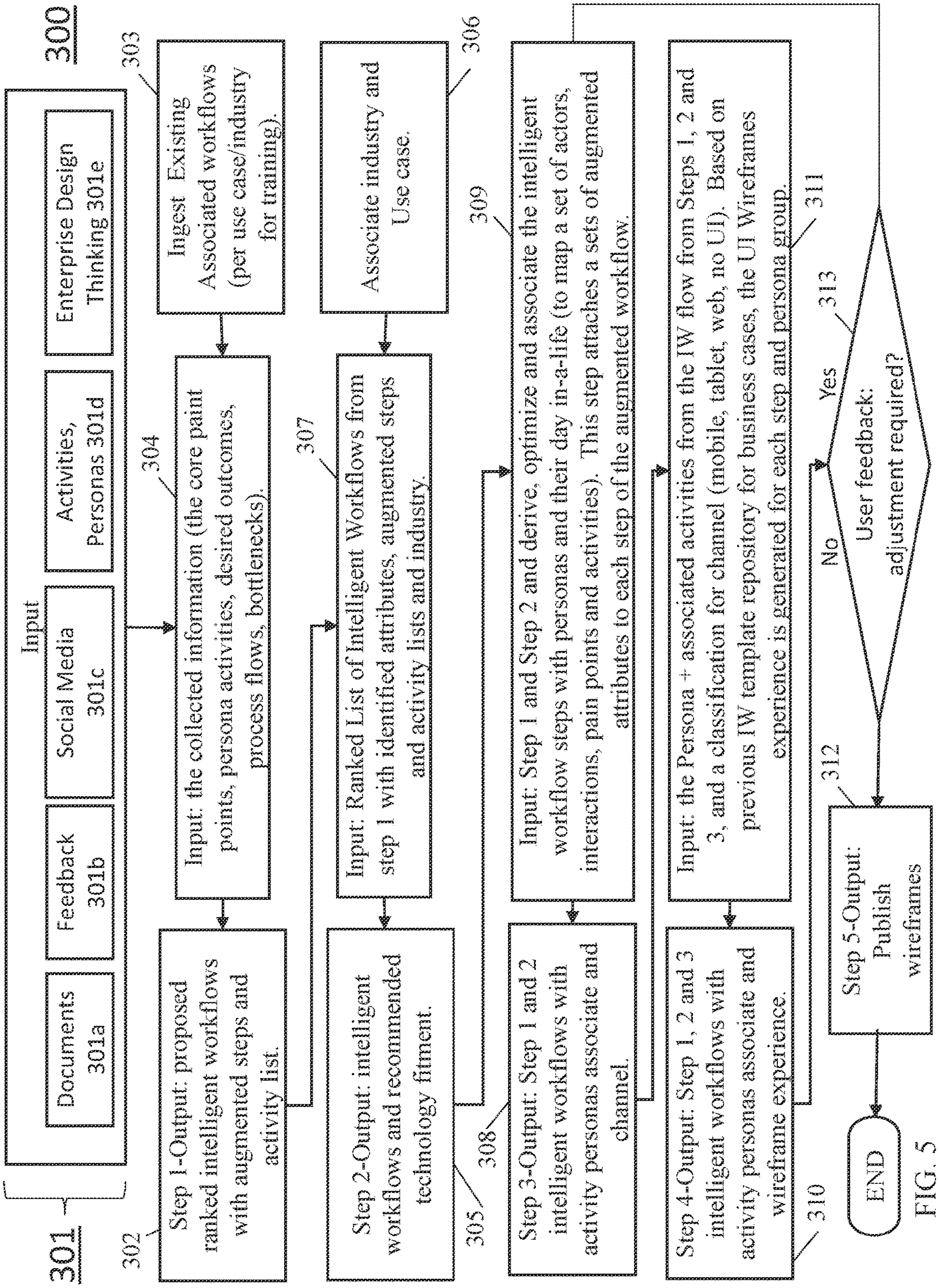
FIG. 5 is a flow/block diagram illustrating five steps of a method for rendering a user experience template in an intelligent workflow, in accordance with some embodiments of the present disclosure.
Figure 6:
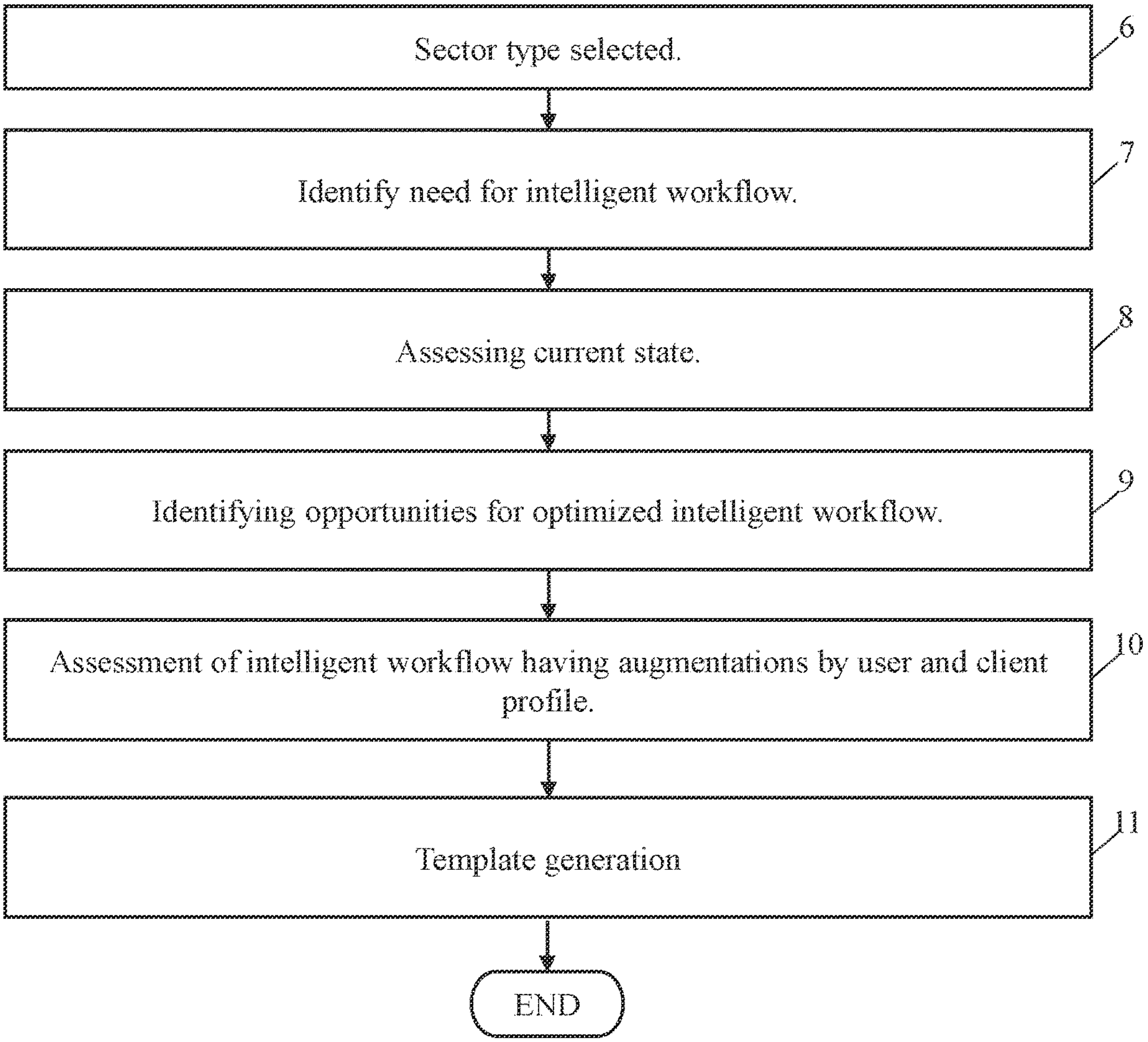
FIG. 6 is a detailed flow/block diagram showing a method for using artificial intelligence to assess a user's workflow on a task, in accordance with some embodiments of the present disclosure.
Figure 7:
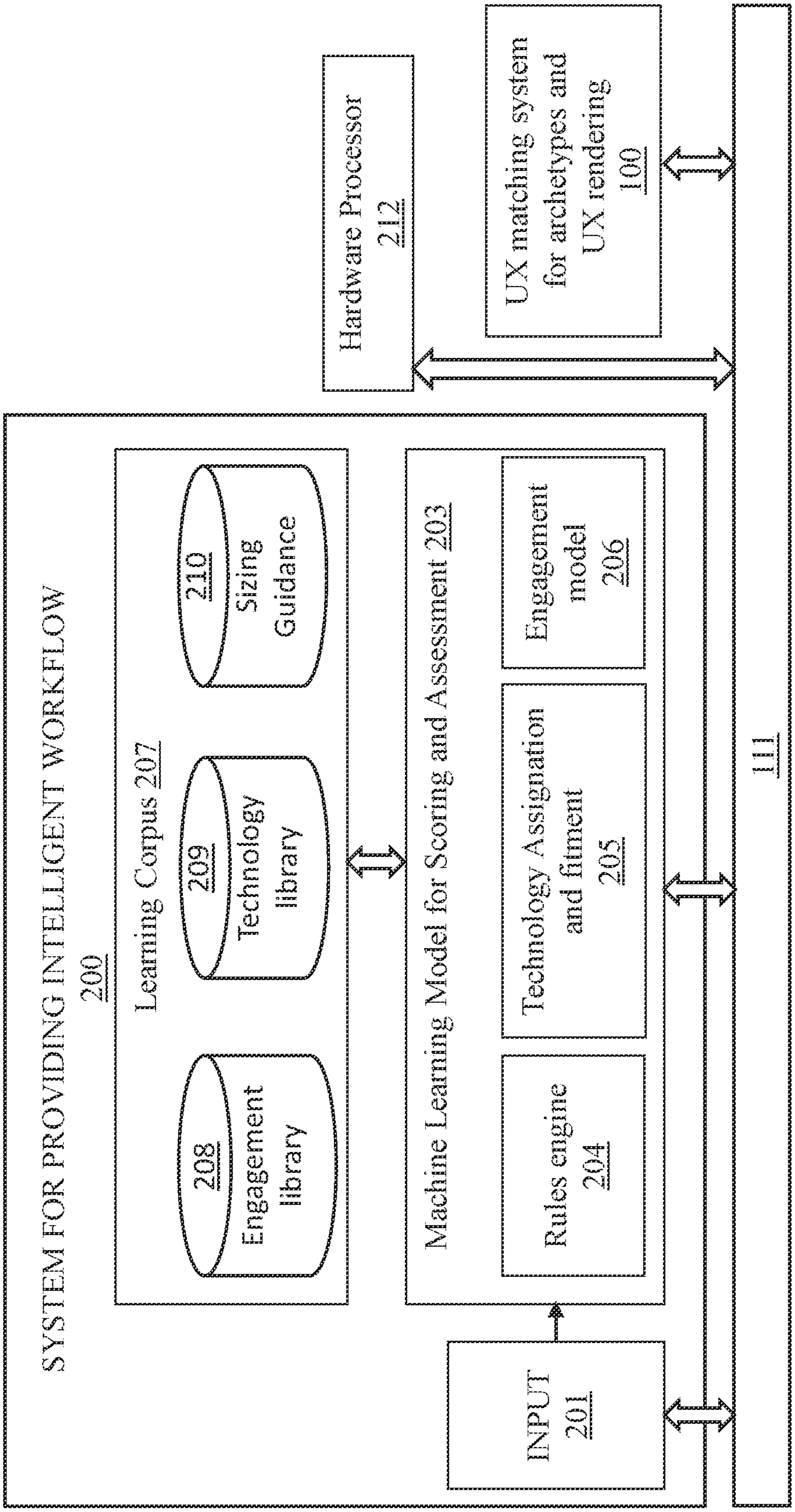
FIG. 7 is a block diagram depicting a system for using artificial intelligence to assess a user's workflow on a task, in accordance with some embodiments of the present disclosure.

The computer implemented method depicted in FIG. 2, and the UX matching system 100 for archetypes and UX rendering depicted in FIG. 3, can be integrated into a computer implemented method for providing an intelligent workflow (IW) as described in FIGS. 5 and 6, as well as the system for providing intelligent workflows (IW) that is depicted in FIG. 7.

FIG. 5 illustrates one embodiment of an artificial intelligence model 300 used for providing an intelligent workflow. In some embodiments, ranking the workflows and selecting the most appropriate one may include a subset of injesting existing associated workflows (per use case/industry) at block 303, and can further include identifying based on input information the core pain points, persona activities and desired outcomes, as well as process flows and bottlenecks at block 304.

At step 2 (identified by reference number 305) of the artificial intelligence (AI) model, the method can continue with recommending a technology fitment. In some embodiments, recommending a technology fitment can include associating an industry and use case at block 306. At block 307, recommending a technology fitment may continue with augmenting the intelligent workflow with the identified attributes and augment steps and activity list.

At step 3 (identified by reference number 308) of the artificial intelligence (AI) model, an intelligent workflow is provided with steps, activities, personals and channel. Channel is the where the user experience is occurring. For example, whether the user experience is mobile or fixed, e.g., at a desktop.

In one example, the method provided by steps 1-3 of the model depicted in FIG. 5 can be described with reference to FIG. 6.

Referring to FIG. 6, in one embodiment, the computer implemented method can include first defining the sector in which the user workflow is operating at block 6. Examples of sectors can be audit/planning, manufacturing/industry, emergency response, etc. The sectors described above are provided for illustrative purposes only, and it is not intended that the present disclosure be limited to only these examples. The sector is merely one characteristic that helps to classify the type of workflow being analyzed. As will be further described below, identifying the sector can be achieved by the user specifically entering this information into an intelligent workflow (IW) user experience (UX) matching system 200, as illustrated in FIG. 7. The system 200 has access to a corpus of data on workflows 207, which in some instances have already incorporated technologies suitable for streamlining workflows. Some examples of technologies that have been identified having recorded abilities suitable for streamlining workflows can include block chain memory, cloud (e.g., hybrid cloud) computing, artificial intelligence (AI), Internet of Things (IoT) devices, edge computing, and 5G networks. It is noted that the aforementioned list is not exhaustive. Identifying the sector for the workflow to be optimized can help to identify a subset of historical data based on sector that can be used in the process flows for optimizing the existing workflow of the user.

Referring to block 7, the method may continue with identifying the need for the intelligent workflow (IW). This step defines the reasons why the workflow is needed. For example, what is the objective of the workflow. In the example, in which the sector is auditing, the need for the intelligent workflow (IW) can be to visualize regulation, fast access to information, fast access to systems and information flow, visual signoff, onsite applications at the point of the audit, as well as timely ease of use. In the example, in which the sector is manufacturing or industry, the need for the intelligent workflow (IW) can be to visualize regulation, fast access to information, fast access to systems and information flow, visual signoff, onsite applications at the point of the audit, as well as timely ease of use. In the example, in which the sector is emergency services, the need for the intelligent workflow can be to provide for AI analysis based on multiple inputs in real time, sequencing events, and insights to view situations from varying perspectives. The system 200 has access to a corpus of data on workflows 207, which may also have similar needs.

Blocks 6 and 7 of FIG. 6 are both examples of data the system receiving data/information regarding a workflow of a user performing a task.

FIG. 5 illustrates a more detailed process flow for the method for providing an intelligent workflow framework. At block 301 of FIG. 5, the user can include input data into an intelligent workflow (IW) user experience (UX) matching system 200. Each individual that can be employing the intelligent workflow (IW) user experience (UX) matching system is different, and comes with a level of domain understanding and flow of activities for a task. The core technology and industry shape the context of where technology can be applied and is fitness to streamline a workflow, all together gathered from a series of users will form "experience patterns" and their associated activities. The experience patterns and associated activities drive the formation of an intelligent workflow to determine the best suited work experience (UX) for the user (employee or customer).

Referring to block 301 of FIG. 5, the method may begin with inputting user data for an existing user experience. In one embodiment, data is input to identify the users, activities, and outputs of mission critical workflows. For example, the input data can include the type of tasks a user is performing. The input data can include documentation on the type of tasks being performed, which can include user procedures, and sequences for the step of the task. The data input can also include logs. The logs can be recorded data on user prior user experience and workflows. The input data can also include collaboration methods and planning.

In one example of the embodiment depicted in FIG. 5, the data input step depicted at block 301 can include documents 301*a*, feedback surveys 301*b*, social media 301*c*, activities 301*d* and interactive sessions 301*e* with the particular objective of determining pain points, i.e., points of problems, in existing workflows. Documents 301*a* can include procedures that are input into the system 300, as well as learning documentation and outcome sample documents. To extract relevant data from these inputs, which are typically text base, for the purposes of providing optimized workflows, natural language processing methods of artificial intelligence may be applied.

The feedback surveys 301*b* are another input of data for use in providing an optimized workflow. The feedback surveys 301*b* can be quizzes, blogs, recorded comments or interviews based upon an existing workflow. These elements can all be referred to data that is collected from capture feedback artificial intelligence. In some instance, in which the collected data is in text, natural language processing may be employed to extract relevant data from the inputs. Recorded content, such as interviews, can be an analyzed for relevant input data using voice detection artificial intelligence based technology.

Social media may be the source of input data that can be extracted using a web crawler and natural language processing from web based platforms. Select employer groups (SEG) and events with particular invite lists may also be used to provide inputs.

The input data at block 301 can also include activities 301*d*, which also includes personas, processes, planning and related timing for the processes and planning. These activities 301*d* may be entered as input for the different elements that can be performed as the workflow. Personas are inputs that provide information on the people in the organization that is using the workflow. Personas include information on the identity of the people, their personal demographics, their normal tasks within the workflow, etc. A persona can also include information on what motivates them and what also frustrates them. Persona information can be provided by forums, direct observation, and interviews.

The input data at block 301 can also include Enterprise Design Thinking (EDT) 301*e*. Enterprise design thinking includes sessions with the users to capture the objects of the existing workflow, the steps of the existing workflows, and if the personas for the organization/user are following the procedures of the workflows. The EDT can particularly be helpful in identifying pain points.

In some embodiments, Enterprise Design Thinking 301*e* starts by bringing together a series of design techniques, such as personas, empathy maps, as-is scenarios, design ideation, to-be scenarios, wireframe sketches, hypothesis-driven design, and minimum viable product (MVP) definition, and adds three principles titled hills, playbacks, and sponsor users. Hills are rooted in user needs and desires. Each hill is expressed as an aspirational end state for users that is motivated by market understanding. Hills define the mission and scope of a release and serve to focus the design and development work on desired, measurable outcomes. Playbacks provide input on the user value in the existing workflow of a project. Sponsor users is the input of people operating in the existing workflow.

The input at blocks 6 and 7 of FIG. 6, and block 301 of FIG. 5, is the introduction of data from client data mining, and information retrieval (IR), that provides research data for user experiences to the system 300 for providing intelligent workflows. The research data can be qualitative, quantitative, planning & execution and collaboration. Types of inputs that can be quantitative can include "empathy mapping", "current state journey", and "to be journey", which are design thinking activities. These are types of insights/features that can be ingested by the AI intelligent system as input data for the system for providing a work experience (UX) framework 300. Empathy mapping, current state journey, and to be journey are all examples of inputs provided by design thinking activities, such as the Enterprise Design Thinking (EDT) 301*e* of FIG. 5.

As noted, the inputs are employed by an artificial intelligence (AI) system. FIG. 7 illustrates one embodiment of an intelligent workflow (IW) user experience (UX) matching system 200 that includes a machine learning (AI) model for scoring and assessment 203. The machine learning model 203 includes a rules engine 204, technology assignment and fitment module 205 and an engagement model 206.

Referring back to the inputs at blocks 6, 7 and 301, empathy maps can define how one or more personas feel regarding an existing workflow, and what they do with the existing workflow. Empathy map can identify the major pain points of the personas.

"Current state journeys" can identify existing activities and tasks per user, e.g., per a persona. A "current state journey" data entry for existing activities and tasks per user can be ingested by the system, e.g., ingested by the machine learning system 203, for providing a work experience (UX) framework 200, and tagged as activities, and can help to cluster the user as a persona with other personas based upon interactions.

The "to be journeys" define the experiences the personas would like to have with key insights on removing bottlenecks, e.g., removing pain points, in workflows. From this input with the perception provided by the empathy maps, the AI intelligent system 203 for the system for providing a work experience (UX) framework 200 can create a problem-need-intelligent outcome" resolution pattern.

In some embodiments, the quantitative types of inputs can be "current state journey" and "pain points". These types of inputs can be extracted from user interviews. User interviews can be provide by the feedback surveys 301*b* of the feedback input 301 for FIG. 5. The "current state journey" is a list of activities that can be ingested by the AI algorithm of the system for providing a work experience (UX) framework 300, which is clustered by persona, and by process to help highlight the list of most major bottlenecks to a streamlined process. In some embodiments, the current state journey can also provide pain points.

The artificial intelligence algorithm may be provided by the rules engine 204 depicted in FIG. 7.

Pain points can also be extracted from user interviews. Pain points can include patterns where fragmentation in a work flow occur. Pain points can show a failure in collaboration. Pain points can also show a redundancy in activities. Data on pain points can be ingested by the AI algorithm, e.g., provided by the rules engine 204, of the system for providing a work experience (UX) framework 200 so that potential areas can be identified to streamline the workflow in a manner acceptable to the personas (users).

In some embodiments, the qualitative research data for the inputs can results from observational research for over the shoulder progress. This can include visual tagging of activities.

Quantitative research types for inputs can include surveys, documentation, and performance reports, which also provides insights/features for the artificial intelligence algorithm of the system for providing a work experience (UX) framework 200. Documents 305*a* and procedures 305*b* are identified as inputs for the method flow described with reference to FIG. 5. Surveys can provide data about specific tasks of the work flow, tool used in the work flows, activities performed in the work flow, as well as any situation that impacts the work flow. The documentation 305*a* input can be a list of documents and their content, which can be analyzed using natural language processing. The documents can be analyzed for input directed to associated tasks in a work flow, Performance reports can also provide data inputs. For example, systems in use in the workflow may have associated performance reports indicating service issues, incidents that result in service disruptions, and reports on overall system performance. This data can be tagged to be associated with the activities in the work flow that they impact.

The type of research data that can serve as input to the system 200 can also include planning and execution data. This data can be directed to time sheets recording and project management reports. The time sheet recordings can be associated with task and personas in the work flow. The management reports can provide data for recurring and in development activities that can impact the work flow.

Additional research data may include collaboration type data. Collaboration type data can include data from a text based messaging system or video conferencing recordings. The text based messaging system can provide common team threads including conversations to detect potential bottlenecks, risk, sentiments or pain points. Similar data can be provided from transcripts of video conferencing recordings.

FIG. 7 is an illustration of a block diagram depicting one embodiment of a system for providing a work experience (UX) framework 200. The intelligent user experience (UX) workflow and behavioral patterns architecture may include an input interface 201 for receiving data on tasks, documentation, logs, collaborative methods and planning. The inputs described with reference to block 201 are all suitable for data in assessing current processes to determine whether a new workflow can be implemented. The data is employed, in combination with existing corpuses of data 207, to train an artificial intelligence model 203 (e.g., train the rules engine 204), which can provide the artificial intelligence algorithms of the system for providing a work experience (UX) framework 200. When training artificial intelligence, the model is being taught to properly interpret data and learn from it in order to perform a task with accuracy. A classifier in machine learning is an algorithm that automatically orders or categorizes data into one or more of a set of "classes." A classifier is the algorithm itself—the rules used by machines to classify data. The model is trained using the classifier, so that the model, ultimately, classifies the input data.

Analysis of the data can begin with establishing an intelligent work flow taxonomy for training the artificial intelligence model.

For example, an activity list is developed. Each activity in a work flow may include a sequence of steps. Each step in a work flow can be associated with a person. The person can be identified by their function, e.g., a claims analyst or an accountant. The person can also be identified as a function, such as being a beneficiary. In some examples, each step in the workflow has a Boolean attribute: sequential/parallel. A Boolean attribute is an attribute that can only be true or false. Each step as a Boolean attribute marking one path of decision. The timeline, duration of the activity in the activity list is also recorded for consideration.

The taxonomy for the intelligent workflow training also includes personas. Each persona has a set of steps.

The taxonomy for training the artificial intelligence model (e.g., rules engine 204) for intelligent workflow also includes pathways. For example, each intelligent workflow has a list of pathways marked as succeeded or blocked depending upon if the intelligent workflow is fully completed.

The intelligent workflow taxonomy for training the artificial intelligence model can include industries.

The intelligent workflow taxonomy can also include use cases. The use case being why the workflow is being performed. One intelligent workflow can fit multiple use cases.

In some embodiments, the intelligent workflow taxonomy may also include a Boolean attribute for marking a whether the workflow is a stand alone process, or whether the workflow is a component of a larger sequence.

In some embodiments, the intelligent workflow taxonomy can also include environmental attributes, such as weather being hazardous.

In some embodiments, Named Entity Recognition (NER), which can employ neural networks (NN), automatically extract features from text that is configured using the above described taxonomy for the purposes of training the artificial intelligence model.

In some embodiments, following the establishment of the taxonomy for training, the method may continue with employing the taxonomy to train models for the intelligent workflow. More particularly, a number of classifiers (provided in the rules engine 204) may be trained for the artificial intelligence model. In some embodiments, a corpus of data on historical workflows, may be employed to train the artificial intelligence model using the taxonomy of terms. For example, training may include the system ingesting the existing intelligent workflow with segmented features by taxonomy for identifying classes. For example, for each intelligent workflow the segmented features of the existing workflow are used to train individual or weighted classifiers selected from an input list activities classifier, a input list of persona and activities, an input business cases/industry classifier, and an input environment data classifier. Training the classifier (rules engine 204) of the artificial intelligence model 203 also includes entity recognition for technology.

In some embodiments, the input list activities can included activities such as send or posting an explanation of benefits (EOB), a receive payment notification, a second payment confirmation, a step of creating an explanation in response to an inquiry. It is noted that the aforementioned list is provided for illustrative purposes only, and is not intended to be limiting. Activities can be used to train an activity identifier classifier, in which the input can be a list of steps in a day in a life or client process; and the output can be a set of activities and their associate workflow.

In some embodiments, the input list of persona and activity can train a classifier that takes as input steps specific actions performed by persons and personas, and learns an association between the activities and the personas. The persona and activity classifier can take as input the raw data from the mining steps, e.g., blocks 6 and 7 of FIG. 6, and block 301 of FIG. 5, and associate client activities/processes/sequences with activities from the intelligent workflows.

In some embodiments, the input business cases/industry classifier can be trained based on the intelligent workflow features of an intelligent workflow tagged with for an industry. The classifier can be used to ingest raw bundled client data and associate business cases and industry cases. The algorithm of the artificial intelligence model can ingest input features and output associated technology, e.g., 5G mobile, internet of things (JOT), blockchain memory, etc., for a given process discovery. The classifier for environmental data is trained similar to the input business case/industry classifier.

In some embodiments, named entity recognition (NER) is used to train and extract entities associated to specific technology patterns. In a following step, activities and steps are classified to the technology patterns. The classifier (e.g., provided by the rules engine 204) ingests client steps, processes business and performs named entity recognition (NER) to extract the technologies being used, and maps the technologies extracted to the activities, etc.

The intelligent workflow artificial intelligence models 203 can employ neural networks (NN) that employs name entity recognition (NER) to train the classifier 204 to be able to propose for a given input a setoff associated intelligent workflow for a given process discovery. The inputs from blocks 6 and 7 of FIG. 6, and block 301 of FIG. 5, provide for collecting, cleansing and curating data from users collaboration tools, activities, data input/output, surveys, research, industry and use cases.

At this point of the present disclosure, the classifier of the artificial intelligence systems has been trained. Artificial Machine learning systems 203 can be used to predict outcomes based on input data. For example, given a set of input data, a machine learning system can predict an outcome. In some embodiments, the artificial machine learning system includes an artificial neural network (ANN). One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process. The trained artificial intelligence model can provide intelligent workflow discovery. For example, when the input is empathy mapping, this information can be used for risk association and pain point identification.

For example, when the client input is a "current state journey", the activity list classifier can help to decompose and find gaps in a current flow of an intelligent workflow being analyzed. Additionally, when the input is the current state journey, the persona classifier match existing client personas with proposed intelligent workflow steps.

When the input is a "to be journey", the activity list classifier can provide outputs for a future state, which basically is a transition from the current state to a desired intelligent workflow state, e.g., by combining a series of intelligent workflows. Persona classifiers and industry/business case/environments classifier may also be applied to the input for the "to be journey".

The intelligent workflow (IW) process discovery can also include analysis of performance and user feedback on the artificial intelligence algorithms and suggested improvements.

The intelligent workflow (IW) process discovery can also include analyzing the input from documentation, i.e., qualitative inputs, for the activity list classifier, persona classifier, technology classifier, as well as industry/business case/environmental classifiers.

Referring to FIG. 6, in a following step the method may continue to block 8, in which a current state assessment may be performed of the workflows currently being employed by the user. The analysis at this stage employed the data that was introduced in blocks 6 and 7 of FIG. 6. In some embodiments, the current state assessment can include a machine learning (ML) model for scoring and assessing the input data on the existing user experience (UX). This may be referred to as attribute collection. Attribute collection can include collecting attributes means collecting data that is describing something. For example, an attribute can be a quality or characteristic of a person, place or thing. The input may also include the sector in which the work flow is being applied. The sector is a business application, e.g., a type of workflow. Examples can include intelligent audit planning, manufacturing (industrial), emergency response systems, as well as others. In this case of a workflow for intelligent audit planning, the attributes can be documents, signature forms, processes, and regulatory procedures. In this case of a workflow for manufacturing, the attributes can be inventor count and mapping to actual inventory, as well as acceptance and failure of product meeting inventory.

The system initiates attribute collection, which includes attribute collection, associate and alignment. More specifically, in some embodiments, artificial intelligence confidence levels can be used to assign confidence levels to technologies of the current process. Additionally, a user interface is provided that allows the user to override the confidence levels being set for the existing workflow.

The current state of assessment at block 8 may employ the trained artificial intelligence model that was described above with reference to blocks 6 and 7 of FIG. 6, as well as block 301 of FIG. 5. The artificial intelligence model captures specific tasks using machine learning, and developing a learning corpus.

Referring to FIG. 6, in some embodiments, the current state of assessment at block 8 may include inputting at block 304 into the artificial intelligence model the collected information from block 301, after training the model with the existing workflows at block 303, in which the existing work flows a per use case and industry, as made available from an existing corpus of learning including know optimized intelligent workflows. Block 304 can include inputting the collected data from block 301, which can include inputting core pain points, persona activities, desired outcomes, process flows and bottlenecks into the trained model.

Referring to block 302, the output of the artificial intelligence model for intelligent workflows (IW) may include proposed ranked intelligent workflows (IW) with augmented steps and activity list.

Referring back to FIG. 6, the method may continued to block 9 with opportunities for intelligent workflows being identified. For example, the opportunities for the intelligent workflows can include assigning technologies for overcoming the difficulties that result in pain points in the current flow and/or bottlenecks in the current flow. This can be provided by the technology assignment and fitment mode 205 of the machine learning mode 203. The technologies can include blockchain memory, cloud (hybrid cloud) computing, artificial intelligence (AI), Internet of Things (IoT), edge computing, and 5G mobile communications. Assigning the technologies can include an attribute taxonomy being created that is supported by the selected technologies. Assessment and scoring can occur on levels of automation versus intervention.

Referring to FIG. 6, in some embodiments, the method can include the input at block 307 back into the artificial intelligence models 203 the ranked list of intelligent workflows that were established for analyzing the inputs from block 301 for the current assessment of the workflow. Additionally, the input can be optimized workflows from the same industry and use cases at block 306. More specifically, at block 307 the input can be the ranked list of intelligent workflows with the identified attributes, augmented steps and activity lists, e.g., per industry. The output from the artificial intelligence model 203 at block 305 can be the intelligent workflows from the output of the artificial intelligence model at block 302, which was an assessment of the client at the current state, with the addition of recommended technology fitments as assigned by the technology assignment and fitment module 205. Assigning technology fitments can include adjusting attributes and recommended user experiences to match the technology and user needs.

Still referring to FIG. 5, in some embodiments, a third round of inputs is ingested into the artificial intelligence model 203 to optimize the workflow. For example, at block 309, the third round of input can be take the outputs from blocks 302 and 305, and derive, optimize and associate the intelligent workflow steps with the personas and their day-in-a-life. In this example, the artificial intelligence model 203 maps a set of actors, interactions, pain points and activities that is specific to the user. This step can attach a set of augmented attributes to each step of the augmented workflow. The output of this round of analysis at block 308 includes the proposed ranked intelligent workflow from block 18, and the recommended technology fitment from block 308 with an additional factor provided by fitment to activities, personas and experience specific to the user.

Referring back to FIG. 6, in some embodiments, the method may continue to block 10, which includes a user assessment for the client profile. The user assessment brings a human perspective to the optimized intellectual workflow steps. The user assessment at block 10 takes into account whether the recommended technology fitment is acceptable to the user. Referring to FIG. 7, in some embodiments, the system includes an experience template generator, i.e., UX matching system for archetypes and UX rendering 100. The UX matching system for archetypes and UX rendering 100 is further described with reference to FIG. 3. The experience template generator can provide a user interface (UI) to illustrate to the user intelligent process flows that have been augmented with technology for their acceptance. An optimized intelligent workflow value is in acceptance by the user to implement. In some embodiments, the user assessment takes into account the needs of the user, and how the user can engage the new skills.

In the process flow depicted in FIG. 6, the template generation is depicted by block 11. Template generation has been further described with reference to FIGS. 2 and 3, as well as blocks corresponding to steps 4 and 5 (blocks 310, 311, 312 and 313) of FIG. 5.

Turning to step 4 of the method depicted in FIG. 5, step 4 may include block 310 which includes taking the intelligent workflow using the steps, activities, personas and channel from steps 1, 2 and 3 and integrating the intelligent workflow into a template for presentation to the user. The template is specific to the archetype of the user and the intelligent workflow. From the channel, i.e., the mode by which the archetype is interacting in the intelligent workflow, an interface, e.g., user interface wireframes, can be generated. A "wireframe" is a two-dimensional illustration of an interface, i.e., user interface, that specifically focuses on space allocation and prioritization of content, and functionalities available. The wireframe can also take into account the behaviors the user will have in working in the intelligent workflow. From the intelligent workflow framework, the method facilitates a human centered design engagement model that can increase attentiveness and responsiveness that is directed correlated and linked to an increase in optimization, productivity, and efficiency. The system dynamically renders the UX design based on the type of technology, attributes, user engagement model, and persona archetypes. For example, the UX design includes an experience template, e.g., wireframe, rendered to support the technology and archetype needs of the workflow. For example, to provide the template at step 4, the input at block 311 can be the persona+associated activities from the IW flow and the classification for channel, e.g., mobile, tablet, web, and no user interface (UI). In some embodiments, based on previous UX template repository 112 for business cases, the method can generate the UI Wireframes experience for each step and persona group.

Referring to block 313 of FIG. 5, in some embodiments, a user experience (UX) design is rendered and tested. The user design is based on the type of technology, user engagement model and persona archetypes. In some embodiments, an experience template is rendered to support the technology, modality. The user experience (UX) is tested iteratively. For example, referring to block 313 of FIG. 5, a loop is illustrated where the user feedback on the intelligent workflow is analyzed as to whether the experience is suitable or needs additional refinement. If it is decided that the user experience with the intelligent workflow that is proposed is acceptable at block 312, the intelligent workflow is confirmed and the process can end with an optimum and adaptable process. If the intelligent workflow is not acceptable at block 313, the process may loop back to block 309 of FIG. 5. Adjustments are made to the user experience based on specific user preferences, and the level of actual engagement. This loop may continue until a user confirms the suitability of the intelligent workflow.

Referring to FIG. 5, the loop of user feedback at block 313 may include identifying breakouts in the intelligent workflow, and rendering the user experience (UX) method/approach. The artificial intelligence model can distinguish renderings based on global audience and independent cultural norms. A user interface (UI) presents updates to the intelligent workflow (IW) using a template that enables the user to be updated each time the work flow is optimized. The updates may be provided to the user through the user experience (UX) matching system for archetypes and UX rendering 100 depicted in FIG. 2.

When an intelligent workflow has been approved, the workflow may be added to the learning corpus 207. In this manner, the approved intelligent workflow can be added to the learning corpus 207 of the system for providing intelligent workflows depicted in FIG. 7. Further, when a user experience (UX) template (also referred to as UX rending) has been approved, the approved user experience (UX) template is added to the repository 112. In this manner, with each application of the system the learning corpus expands and provides for more accurate enhancements of workflows in following applications.

Referring to block 3 of the process flow depicted in FIG. 2, the method may continue to measuring, refining and personalizing the user experience method, as used. For example, continuous monitoring and adjustments can be made. An automated user experience can be provided having a templated modularization that enables the user interface (UI) to dynamically update. The user interface (UI) is multi-modal and can manifest depending on environment and user driven needs.

FIG. 7 illustrates one embodiment of an intelligent workflow (IW) user experience (UX) matching system 200 that includes a machine learning model 203. The machine learning model 203 (which is also referred to as an artificial intelligence model 203) can include a rules engine 204, a technology assignation and fitment engine 205, and an engagement model 206. The machine leaning engine 203 can collect, measure and align the data received from the input interface 201. Using machine leaning (ML), specific tasks can be captured, and a learning corpus can be established 207. The learning corpus 207 can include an engagement model library 208, a technology library 209 and a sizing guidance library 210. The intelligent workflow (IW) user experience (UX) matching system 200 also includes an user experience (UX) matching system for archetypes and UX rendering 100. The user experience (UX) matching system for archetypes and UX rendering 100 is further described above with reference to FIG. 3.

The system 200 applies artificial intelligence to assess a user's workflow on a task. The system can include a hardware processor 212; and a memory that stores a computer program product. The computer program product when executed by the hardware processor, causes the hardware processor to receive data through the input interface 201 regarding a workflow of a user completing a task, and assessing the data to identify attributes of the workflow that is expressed in a series of steps. The computer program product can also employ the hardware processor to analyze the steps of the workflow to identify areas of improvement. This can be done using the learning corpus 207 and the machine learning model 203. In some embodiments, the computer program product using the processor can generate augmentations from a plurality of technology fitments matched to the areas for improvement in the steps of the workflow. The computer program product can also generate, using the processor, a user experience template, wherein content of the user experience template is selected based upon at least an archetype for which the generating the augmentation from the plurality of technology fitments was performed. The user experience template can be provided by the user experience matching system for archetypes and UX rendering 100. The computer program product can also send, using the processor, the augmentations formatted in the user experience template to a user device for communicating to the user.

Figure 8:
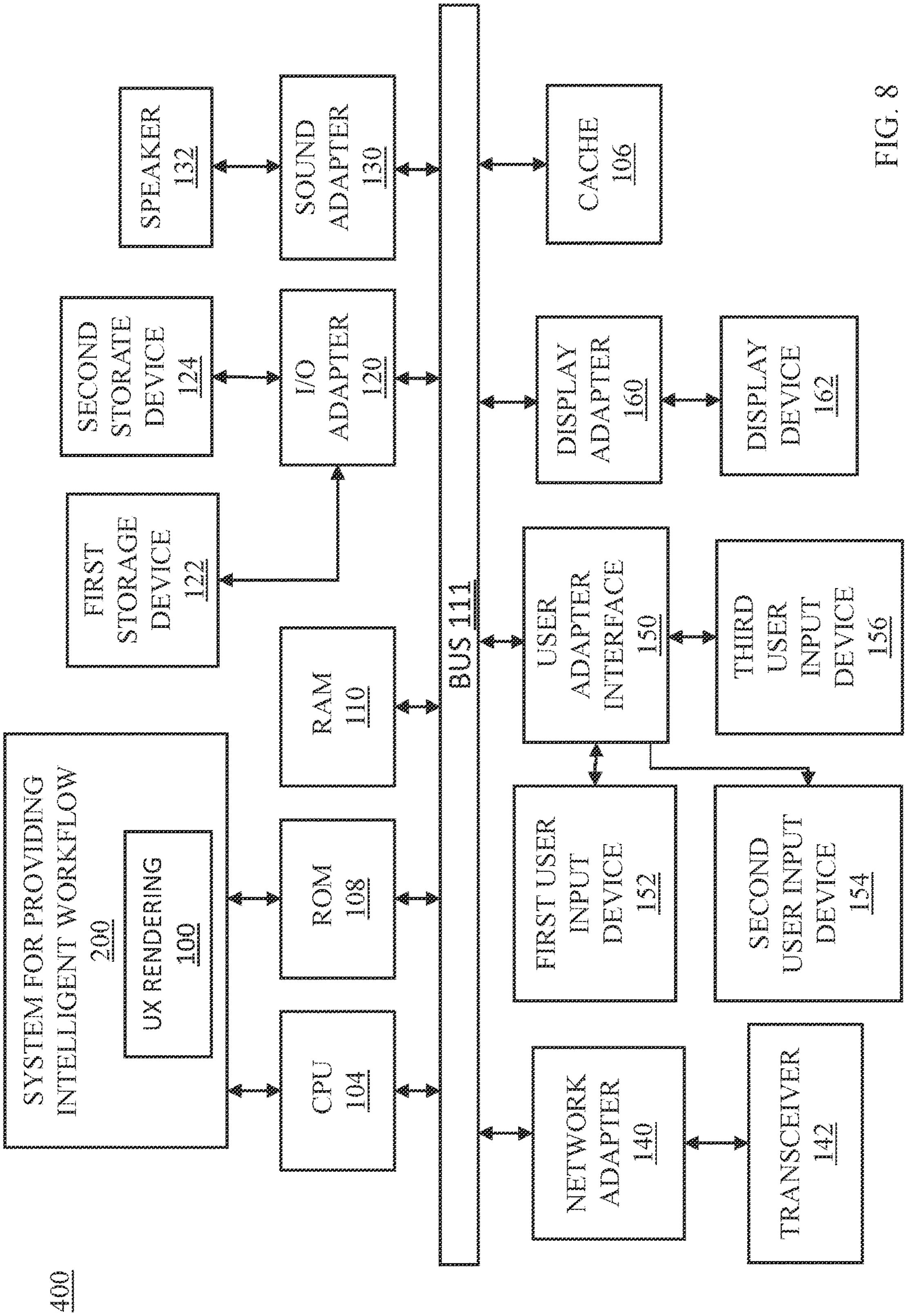
FIG. 8 is a block diagram illustrating a system that can incorporate the system for using artificial intelligence to assess a user's workflow on a task that is depicted in FIG. 7, in accordance with one embodiment of the present disclosure.

FIG. 8 illustrates a processing system 400 used by or comprised by the system 200 of FIG. 7, in accordance with the methods and systems described above in FIGS. 1-3. The bus 111 interconnects the plurality of components for the system 200 described above with the components depicted in the computer system 400 depicted in FIG. 8.

The processing system 400 includes at least one processor (CPU) 204 operatively coupled to other components via a system bus 102. A cache 106, a Read Only Memory (ROM) 208, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 111 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 111 by the sound adapter 130. A transceiver 142 is operatively coupled to system bus 111 by network adapter 140. A display device 162 is operatively coupled to system bus 111 by display adapter 160.

A first user input device 152, a second user input device 154, and a third user input device 156 are operatively coupled to system bus 111 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 200.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for using artificial intelligence to assess a user's workflow on a task. The computer program product can include a computer readable storage medium having computer readable program code embodied therewith. The program instructions executable by a processor to cause the processor to receive data regarding a workflow of a user completing a task; assess the data to identify attributes of the workflow that is expressed in a series of steps; and analyze the steps of the workflow to identify areas of improvement. The program instructions can also generate, using the processor, augmentations from a plurality of technology fitments matched to the areas for improvement in the steps of the workflow; and generate, using the processor, a user experience template. The content of the user experience template is selected based upon at least an archetype for which the generating the augmentation from the plurality of technology fitments was performed. The program instructions can also send, using the processor, the augmentations formatted in the user experience template to a user device for communicating to the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 9:
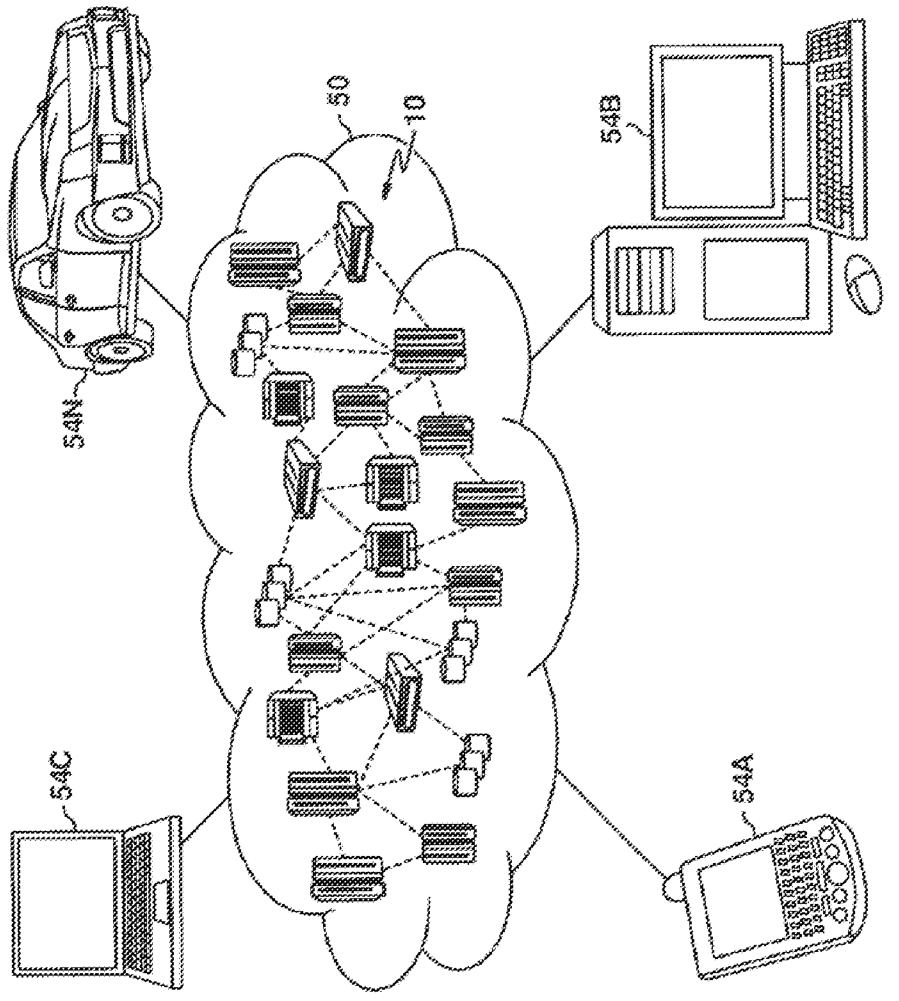
FIG. 9 depicts a cloud computing environment according to an embodiment of the present disclosure.

Referring now to FIG. 9, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 10:
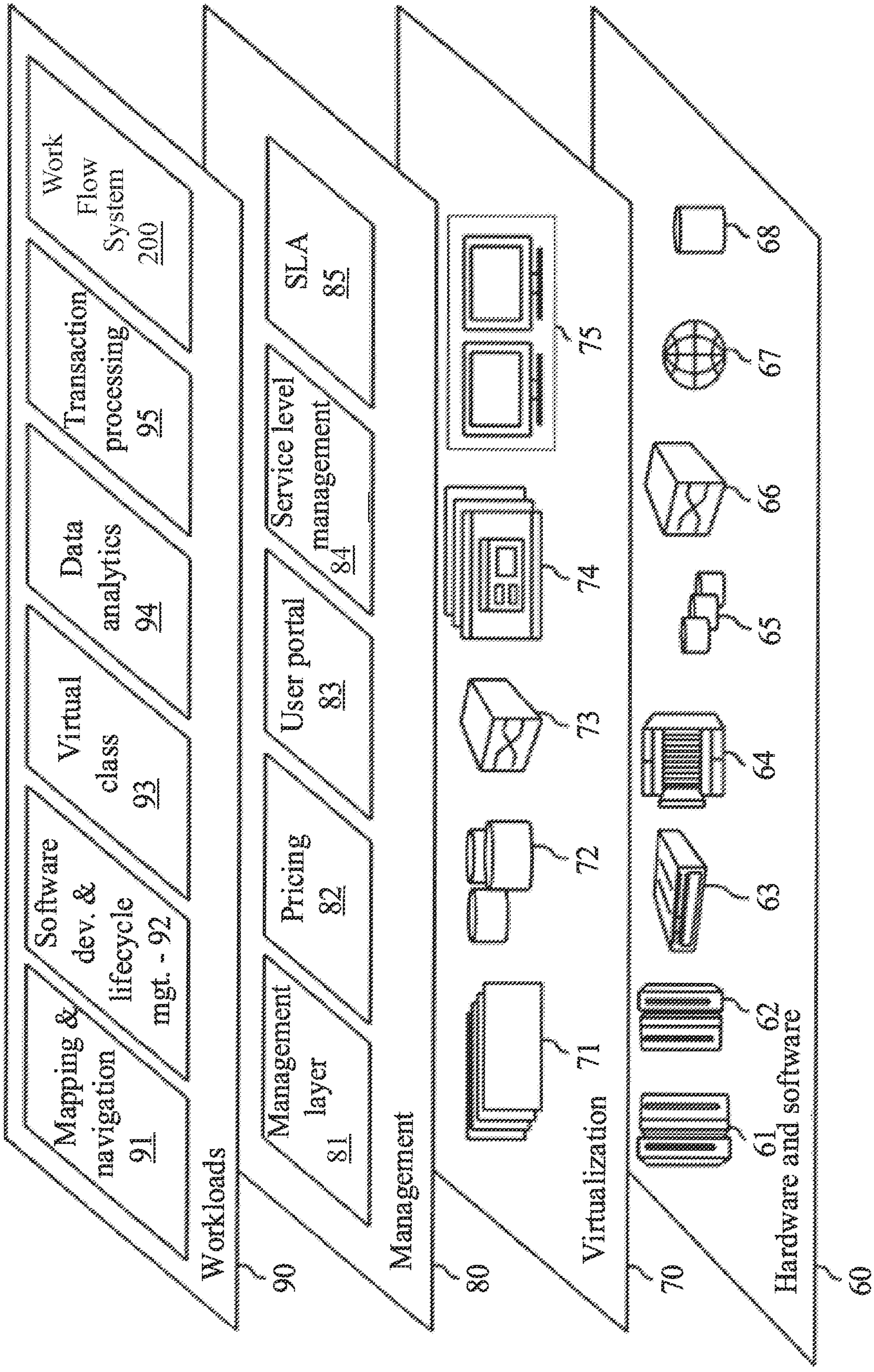
FIG. 10 depicts abstraction model layers according to an embodiment of the present disclosure.

Referring now to FIG. 10, a set of functional abstraction layers provided by cloud computing environment (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for an intelligent workflow system 96 in hardware devices in accordance with FIGS. 1-10.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method for assessing workflow of a user on a task, the computer-implemented method comprising:

receiving data regarding the workflow of the user completing the task;

assessing the data to identify attributes of the workflow that is expressed in a series of steps;

determining, based on the data regarding the workflow, a plurality of bottlenecks associated with the workflow, wherein the plurality of bottlenecks includes patterns indicating fragmentation in the workflow, and the plurality of bottlenecks indicates a failure in collaboration associated with the workflow, and redundancy in a plurality of activities associated with the workflow;

analyzing, with a neural network, the series of steps of the workflow to identify areas of improvement in the series of steps of the workflow;

generating, with the neural network, augmentations from a plurality of technology fitments matched to the areas of improvement in the series of steps of the workflow, wherein the augmentations include user interface elements that communicate a status of the plurality of technology fitments within the workflow, and the plurality of technology fitments overcomes the plurality of bottlenecks;

generating, with the neural network, a user experience template, wherein content of the user experience template is selected based on an archetype associated with the workflow, and the generating of the augmentations is performed for the archetype;

sending the augmentations, formatted in the user experience template, to a user device for communicating to the user;

rendering, with the neural network, user interfaces for the user experience template, wherein the user interfaces are rendered for an optimized user experience that resolves the areas of improvement of the workflow based on feedback associated with the user experience template;

determining, based on environmental factors associated with the user, a modality associated with the user device; and dynamically updating the user interfaces to meet display requirements of the modality.

2. The computer-implemented method of claim 1 further comprising:

receiving confirmation of the plurality of technology fitments to business practices associated with the archetype; and adjusting, based on the receiving of the confirmation, the augmentations for providing an optimized workflow.

3. The computer-implemented method of claim 1, wherein the content of the user experience template is further selected based on the plurality of technology fitments.

4. The computer-implemented method of claim 1, wherein the content of the user experience template is further selected based on the modality associated with the user device.

5. The computer-implemented method of claim 4, wherein the modality associated with the user device is selected from the group consisting of a desktop type device, a mobile device, a wearable device, a voice interface device, a virtual device, and combinations thereof.

6. The computer-implemented method of claim 1, wherein the content of the user experience template is further selected based on environment of the workflow.

7. The computer-implemented method of claim 1, wherein the generating of the user experience template comprises a user experience template matching comprising the neural network that is trained to match historical templates that are tagged from the group consisting of technology, the modality, the archetype, environment, and combinations thereof to the respective archetype for which the generating of the augmentations was performed.

8. The computer-implemented method of claim 1, wherein the plurality of technology fitments is selected from the group consisting of blockchain memory, cloud computing, Internet of Things (IoT) applications, applications for artificial intelligence (AI), applications for edge computing, applications for 5G mobile communications, and combinations thereof.

9. The computer-implemented method of claim 1, wherein the analyzing of the series of steps of the workflow to identify the areas of improvement comprises using a learning corpus of existing workflows to train a classifier of an artificial intelligence model that can match the data to the existing workflows for determining the plurality of technology fitments, and wherein the existing workflows are different from the workflow of the user.

10. The computer-implemented method of claim 1, wherein the generating of the augmentations from the plurality of technology fitments matched to the areas of improvement includes selecting the plurality of technology fitments by business sector associated with the workflow.

11. The computer-implemented method of claim 2, further comprising:

updating, based on the adjusting of the augmentations, a learning corpus with the optimized workflow.

12. A system for using artificial intelligence to assess workflow of a user on a task, the system comprising:

a hardware processor; and a memory that stores a computer program product, the computer program product when executed by the hardware processor, causes the hardware processor to:

receive data regarding the workflow of the user completing the task;

assess the data to identify attributes of the workflow that is expressed in a series of steps;

determine, based on the data regarding the workflow, a plurality of bottlenecks associated with the workflow, wherein the plurality of bottlenecks includes patterns that indicate fragmentation in the workflow; and the plurality of bottlenecks indicates a failure in collaboration associated with the workflow, and redundancy in a plurality of activities associated with the workflow;

analyze, with a neural network, the series of steps of the workflow to identify areas of improvement in the series of steps of the workflow;

generate, with the neural network, augmentations from a plurality of technology fitments matched to the areas of improvement in the series of steps of the workflow, wherein the augmentations include user interface elements that communicate a status of the plurality of technology fitments within the workflow, and the plurality of technology fitments overcomes the plurality of bottlenecks;

generate, with the neural network, a user experience template, wherein content of the user experience template is selected based on an archetype associated with the workflow, and the generation of the augmentations is performed for the archetype;

send the augmentations, formatted in the user experience template, to a user device for communicating to the user;

render, with the neural network, user interfaces for the user experience template, wherein the user interfaces are rendered for an optimized user experience that resolves the areas of improvement of the workflow based on feedback associated with the user experience template;

determine, based on environmental factors associated with the user, a modality associated with the user device; and dynamically update the user interfaces to meet display requirements for the modality.

13. The system of claim 12, wherein the computer program product further causes the hardware processor to:

receive confirmation of the plurality of technology fitments to business practices associated with the archetype; and adjust, based on the reception of the confirmation, the augmentations to provide an optimized workflow.

14. The system of claim 12, wherein the content of the user experience template is further selected based on the plurality of technology fitments.

15. The system of claim 12, wherein the content of the user experience template is further selected based on the modality associated with the user device.

16. The system of claim 12, wherein the content of the user experience template is further selected based on environment of the workflow.

17. The system of claim 12, wherein the generation of the user experience template comprises a user experience template matching comprising the neural network that is trained to match historical templates that are tagged from the group consisting of technology, the modality, the archetype, environment, and combinations thereof to the respective archetype for which the generation of the augmentations was performed.

18. A computer program product for using artificial intelligence to assess a workflow of a user on a task, the computer program product comprises a computer readable storage medium having computer readable program code embodied therewith, the computer readable program code executable by a processor to cause the processor to:

receive, using the processor, data regarding the workflow of the user completing the task;

assess, using the processor, the data to identify attributes of the workflow that is expressed in a series of steps;

determine, using the processor, based on the data regarding the workflow, a plurality of bottlenecks associated with the workflow, wherein the plurality of bottlenecks includes patterns that indicate fragmentation in the workflow, and the plurality of bottlenecks indicates a failure in collaboration associated with the workflow, and redundancy in a plurality of activities associated with the workflow;

analyze, using the processor with a neural network, the series of steps of the workflow to identify areas of improvement in the series of steps of the workflow;

generate, using the processor with the neural network, augmentations from a plurality of technology fitments matched to the areas of improvement in the series of steps of the workflow, wherein the augmentations include user interface elements that communicate a status of the plurality of technology fitments within the workflow, and the plurality of technology fitments overcomes the plurality of bottlenecks;

generate, using the processor with the neural network, a user experience template, wherein content of the user experience template is selected based on an archetype associated with the workflow, and the generation of the augmentations is performed for the archetype;

send, using the processor, the augmentations formatted in the user experience template to a user device for communicating to the user;

render, with the neural network, user interfaces for the user experience template, wherein the user interfaces are rendered for an optimized user experience that resolves the areas of improvement of the workflow based on feedback associated with the user experience template;

determine, based on environmental factors associated with the user, a modality associated with the user device; and dynamically update the user interfaces to meet display requirements for the modality.

19. The computer program product of claim 18, wherein the computer readable program code further causes the processor to:

receive, using the processor, confirmation of the plurality of technology fitments to business practices associated with the archetype; and adjust, using the processor, based on the reception of the confirmation, the augmentations to provide an optimized workflow.

20. The computer program product of claim 18, wherein the content of the user experience template is further selected based on the plurality of technology fitments.

* * * * *